(12) United States Patent
Yamazaki

(10) Patent No.: US 12,504,044 B2
(45) Date of Patent: Dec. 23, 2025

(54) DOUBLE-ROW TAPERED ROLLER BEARING ASSEMBLING JIG, AND ASSEMBLING METHOD FOR DOUBLE-ROW TAPERED ROLLER BEARING

(71) Applicant: SUBARU CORPORATION, Tokyo (JP)

(72) Inventor: Satoshi Yamazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 100 days.

(21) Appl. No.: 18/449,513

(22) Filed: Aug. 14, 2023

(65) Prior Publication Data

US 2024/0084847 A1   Mar. 14, 2024

(30) Foreign Application Priority Data

Sep. 12, 2022   (JP) .................................. 2022-144366

(51) Int. Cl.
*F16C 43/04*   (2006.01)
(52) U.S. Cl.
CPC .................................. *F16C 43/04* (2013.01)
(58) Field of Classification Search
CPC ......... F16C 41/04; F16C 41/045; F16C 43/04
See application file for complete search history.

(56) References Cited

U.S. PATENT DOCUMENTS 8,713,800 B2 * 5/2014 Friedl ..................... F16C 43/06
                                                        29/898.07
11,346,399 B2 * 5/2022 Edelmann ........... F16C 33/4676

FOREIGN PATENT DOCUMENTS

| JP | 2002-283805 | | 10/2002 | |
| JP | 2002283805 A | * | 10/2002 | ............. F16C 43/04 |
| JP | 2014088928 A | * | 5/2014 | |

* cited by examiner

*Primary Examiner* — James Pilkington
(74) *Attorney, Agent, or Firm* — Smith, Gambrell & Russell, LLP

(57) ABSTRACT

Double-row tapered roller bearing assembling jig used when assembling, to a rotating member, a double-row tapered roller bearing including a pair of tapered roller bearings disposed facing each other. Each of the pair of tapered roller bearings includes an inner ring, an outer ring, a plurality of tapered rollers rollably disposed between the inner ring and the outer ring, and a cage that holds the plurality of tapered rollers. The cage constitutes cages of the pair of tapered roller bearings. When the double-row tapered roller bearing is assembled to the rotating member, the assembling jig brings and holds one of the cages near to a large end side of one of the inner rings or brings and holds a large flange of the one of the inner rings near to a large end side of the tapered rollers, with a gap reduction.

18 Claims, 14 Drawing Sheets

DOUBLE-ROW TAPERED ROLLER BEARING ASSEMBLING JIG, AND ASSEMBLING METHOD FOR DOUBLE-ROW TAPERED ROLLER BEARING

CROSS-REFERENCE TO RELATED APPLICATIONS

The present application claims priority from Japanese Patent Application No. 2022-144366 filed on Sep. 12, 2022, the entire contents of which are hereby incorporated by reference.

BACKGROUND

The disclosure relates to a double-row tapered roller bearing assembling jig, and an assembling method for a double-row tapered roller bearing that uses the double-row tapered roller bearing assembling jig.

In known art, for example, double-row tapered roller bearings (double taper roller bearings) capable of simultaneously supporting radial load and bidirectional axial load have been widely used in order to rotatably support rotating members such as drive pinion shafts or hubs (see Japanese Unexamined Patent Application Publication No. 2002-283805, for example).

The double-row tapered roller bearing is typically used with a preload applied between inner and outer rings and tapered rollers from the viewpoint of ensuring durability (long lifetime), reliability, and the like. For example, when a rotating member, such as a shaft, is assembled to the double-row tapered roller bearing, the rotating member, such as the shaft, is press-fitted into the double-row tapered roller bearing, expanding the diameter of the inner ring. As a result, the preload is applied.

SUMMARY

An aspect of the disclosure provides a double-row tapered roller bearing assembling jig to be used when assembling, to a rotating member, a double-row tapered roller bearing including a pair of tapered roller bearings disposed facing each other. Each of the pair of tapered roller bearings includes an inner ring, an outer ring, a plurality of tapered rollers rollably disposed between the inner ring and the outer ring, and a cage that holds the plurality of tapered rollers. The cage constitutes cages of the pair of tapered roller bearings. When the double-row tapered roller bearing is assembled to the rotating member, the double-row tapered roller bearing assembling jig brings and holds one of the cages near to a large end side of one of the inner rings, or brings and holds a large flange of the one of the inner rings near to a large end side of the tapered rollers, with a gap between a large end surface of the tapered rollers that constitute one of the tapered roller bearings, and the large flange of the one of the inner rings eliminated or reduced.

An aspect of the disclosure provides a double-row tapered roller bearing assembling jig system. The double-row tapered roller bearing assembling jig system includes double-row tapered roller bearing assembling jigs, and a coupling member configured to couple the double-row tapered roller bearing assembling jigs with each other in an arc shape. Each of the double-row tapered roller bearing assembling jigs being the double-row tapered roller bearing assembling jig.

An aspect of the disclosure provides an assembling method for a double-row tapered roller bearing. The assembling method includes: a first step of attaching the double-row tapered roller bearing assembling jig to the one of the inner rings; a second step of press-fitting a rotating member into a double-row tapered roller bearing to which the double-row tapered roller bearing assembling jig is attached; and a third step of removing the double-row tapered roller bearing assembling jig.

An aspect of the disclosure provides an assembling method for a double-row tapered roller bearing. The assembling method includes: a first step of assembling, in an upside down state, one of inner rings to an outer ring; a second step of attaching, in the upside down state, the double-row tapered roller bearing assembling jig according to claim 4 to a large end surface of the one of the inner rings and an end surface of the outer ring; a third step of returning the upside down state to a right side up state and assembling another of the inner rings; a fourth step of press-fitting, in the right side up state, a rotating member into a double-row tapered roller bearing to which the double-row tapered roller bearing assembling jig is attached; and a fifth step of removing the double-row tapered roller bearing assembling jig.

DETAILED DESCRIPTION

At the time of assembly of a double-row tapered roller bearing, a gap may be formed on a large end side of a tapered roller (between a large end surface of the tapered roller and a large flange of an inner ring) depending on working conditions or the like when a rotating member, such as a shaft, is press-fitted. The gap may remain even after the press-fitting of the shaft. When the double-row tapered roller bearing is used in such a state, preload may be reduced. Since the reduction in preload is a factor that reduces the lifetime of the double-row tapered roller bearing, an invention has been desired that can prevent or restrict such a reduction in preload.

In order to solve the problem described above, it is desirable to provide such a double-row tapered roller bearing assembling jig and such an assembling method for a double-row tapered roller bearing that uses the assembling jig that are capable of preventing or restricting a reduction in preload. This is made possible by preventing or restricting a gap from being formed on a large end side of a tapered roller (between a large end surface of the tapered roller and a large flange of an inner ring) at the time of assembly of the double-row tapered roller bearing, namely, when a rotating member is press-fitted into the double-row tapered roller bearing.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
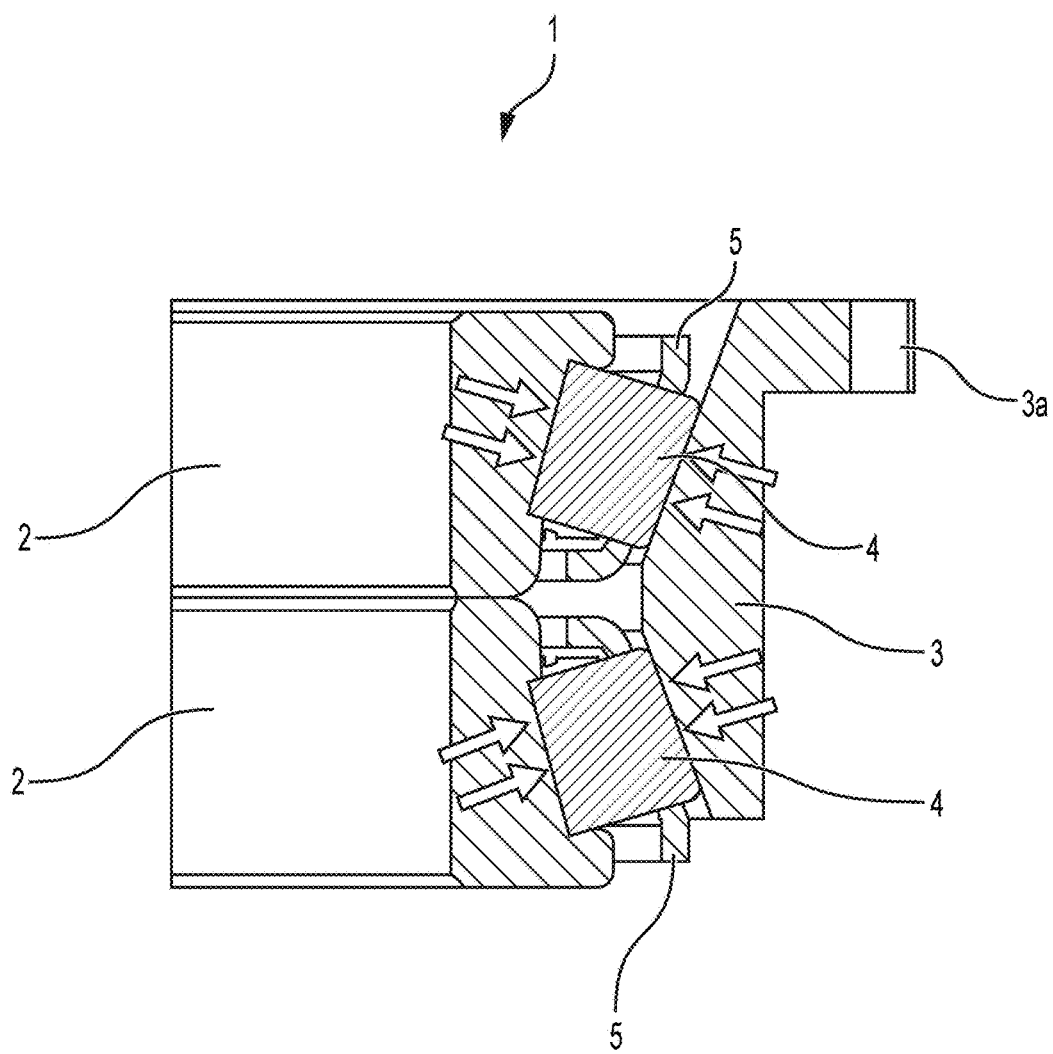
FIG. 1 is a cross-sectional view that illustrates a configuration of a double-row tapered roller bearing.
Figure 2:
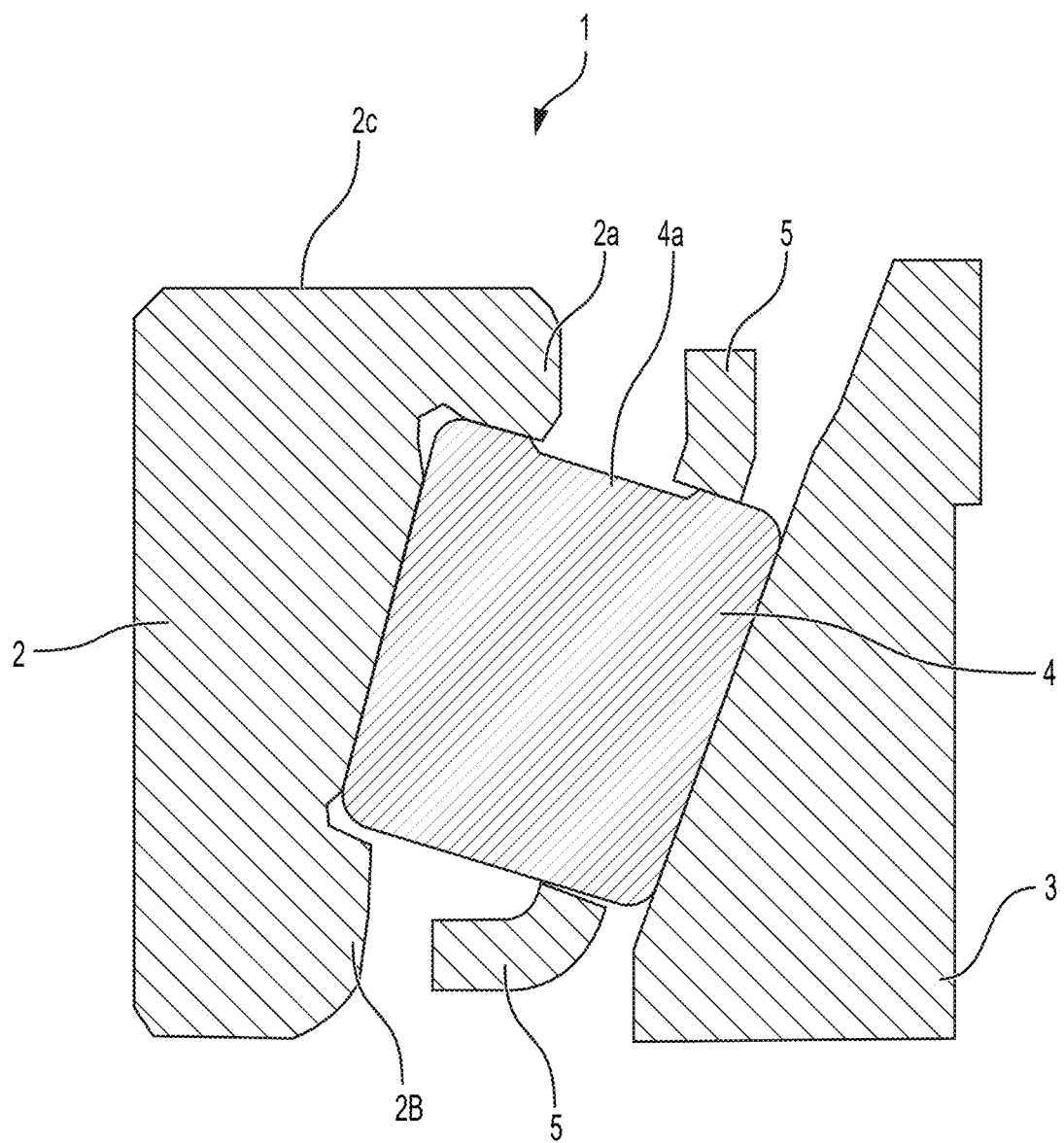
FIG. 2 is a cross-sectional view that illustrates a state (normal state) in which no gap is formed on a large end side of a tapered roller (between a large end surface of the tapered roller and a large flange of an inner ring).
Figure 3:
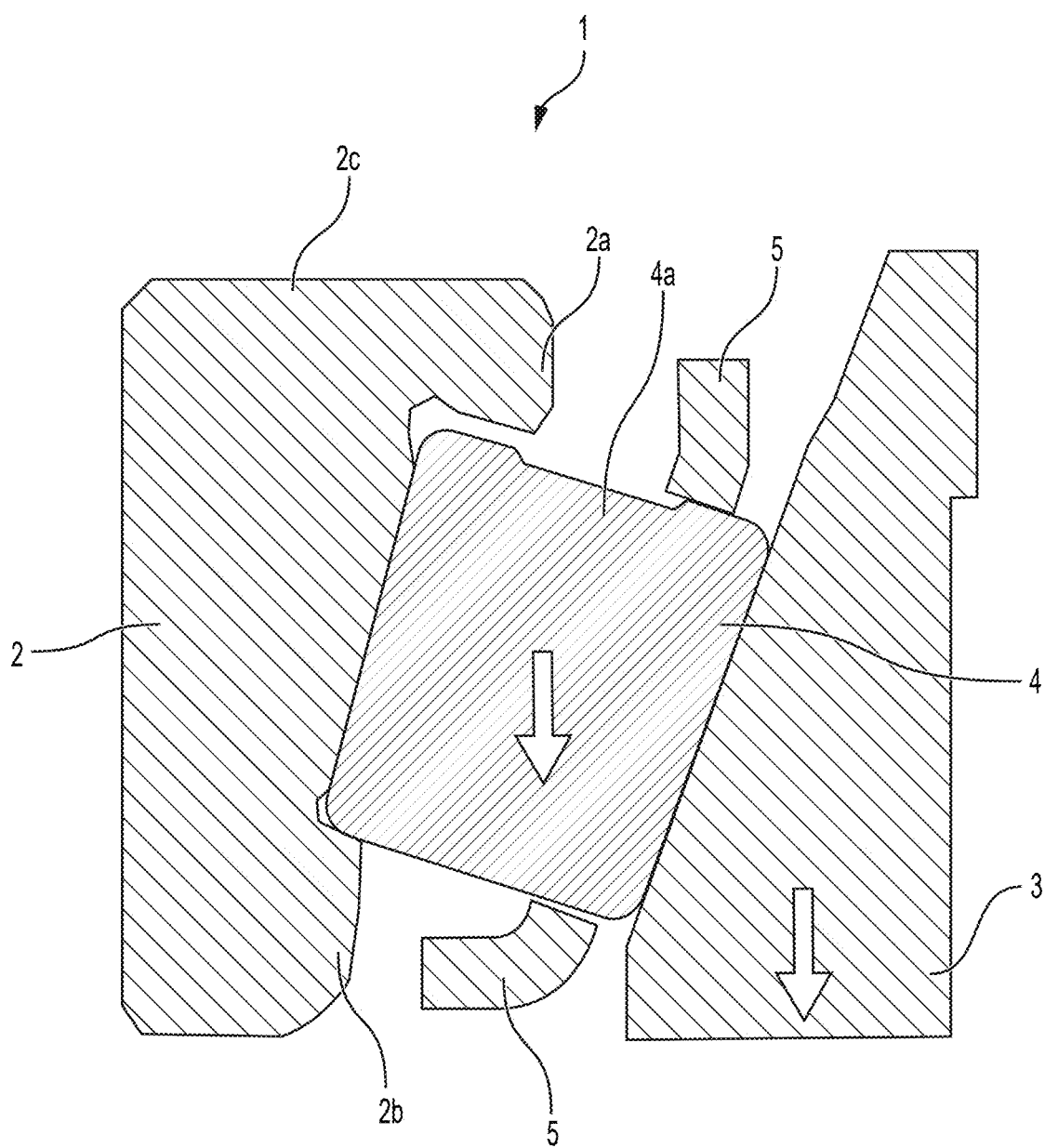
FIG. 3 is a cross-sectional view that illustrates a state in which a gap is formed on the large end side of the tapered roller (between the large end surface of the tapered roller and the large flange of the inner ring).
Figure 4:
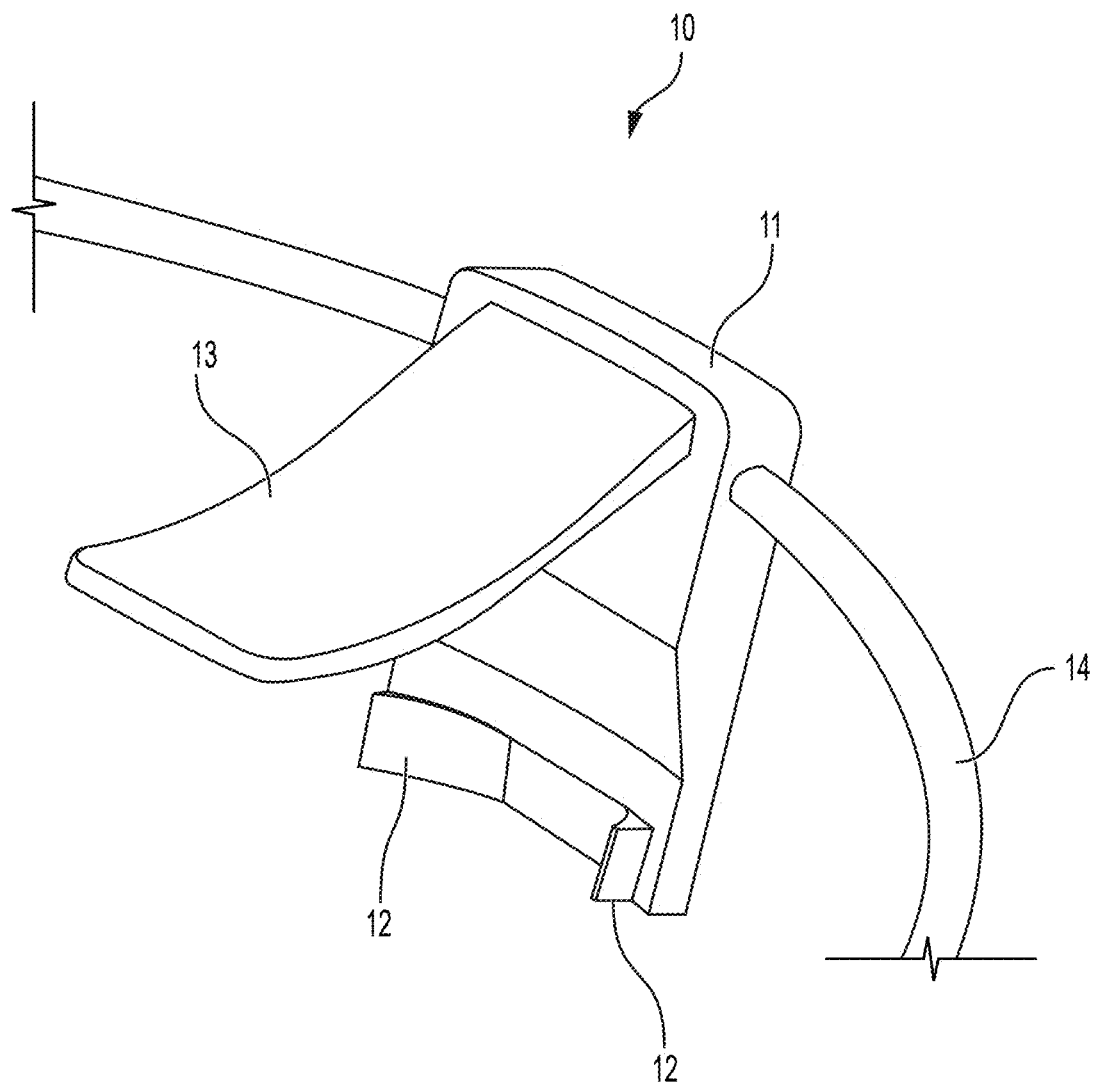
FIG. 4 illustrates a configuration of a double-row tapered roller bearing assembling jig according to an embodiment.
Figure 5:
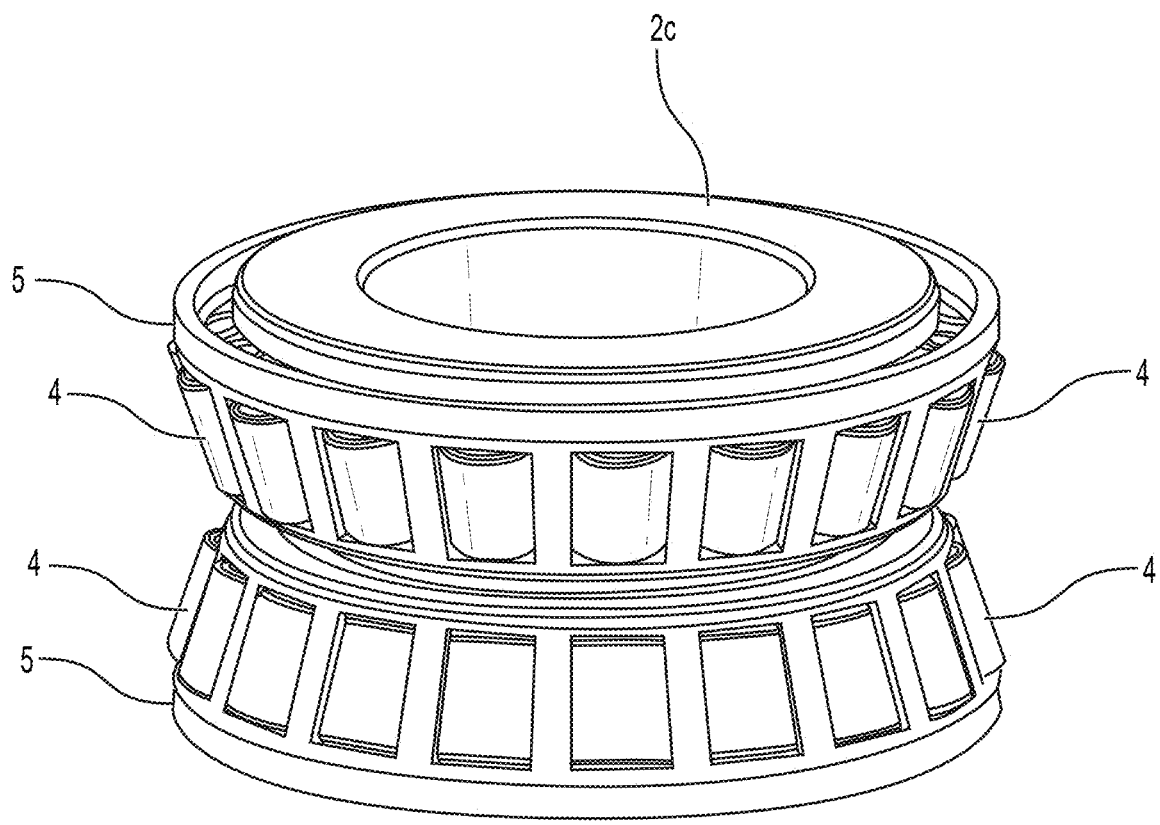
FIG. 5 illustrates the inner ring, the tapered rollers, and cages before the double-row tapered roller bearing assembling jig according to the embodiment is attached.
Figure 6:
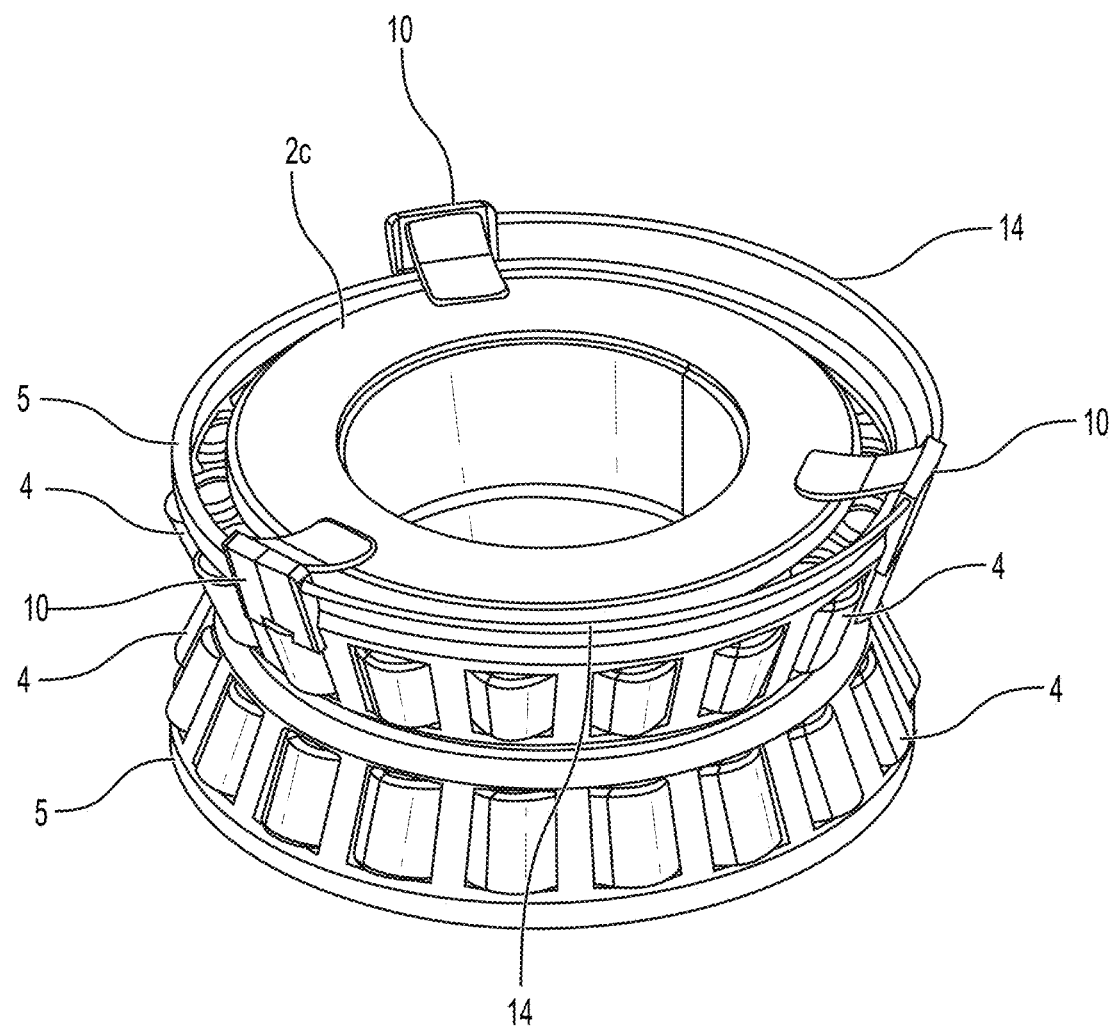
FIG. 6 illustrates the inner ring, the tapered rollers, and the cages to which the double-row tapered roller bearing assembling jig according to the embodiment is attached.
Figure 7:
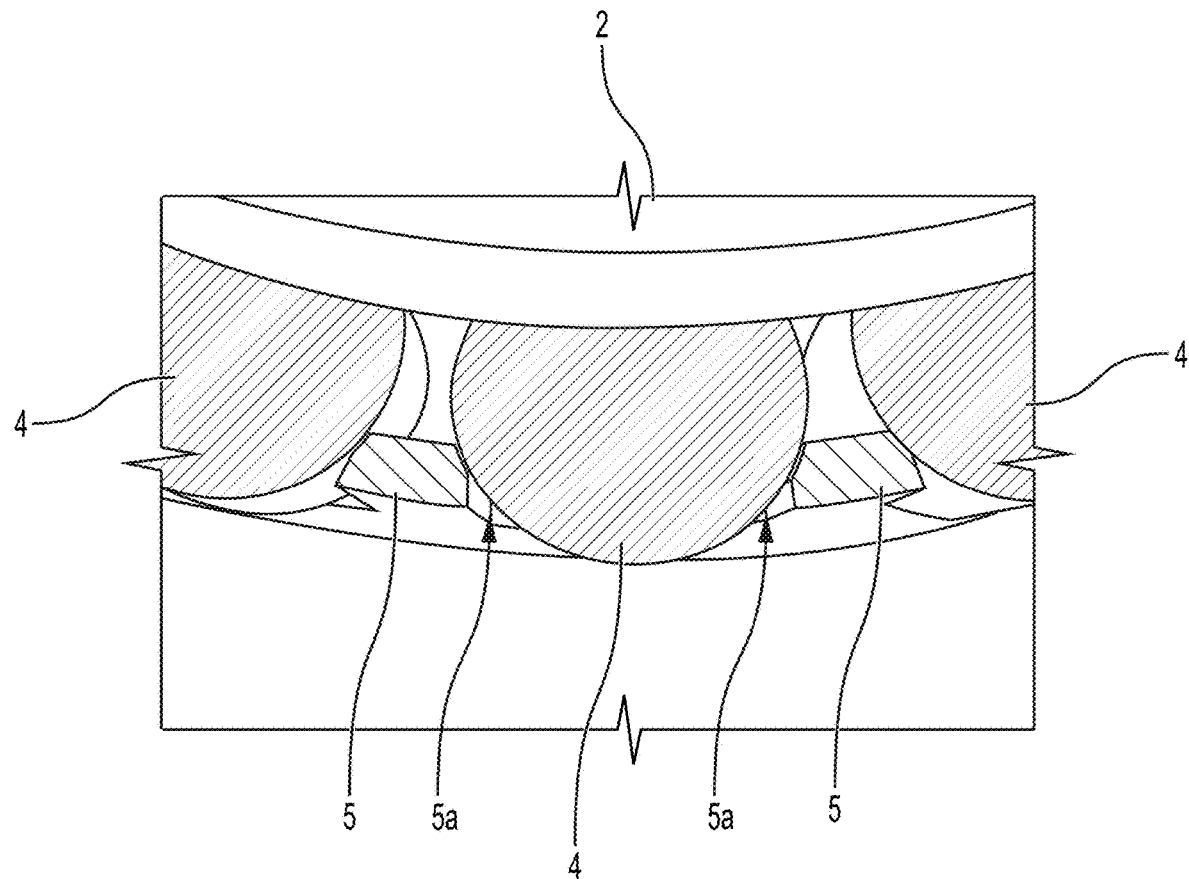
FIG. 7 is an enlarged cross-sectional view that illustrates housing spaces of the cage with which claws of the double-row tapered roller bearing assembling jig according to the embodiment are engaged.
Figure 8:
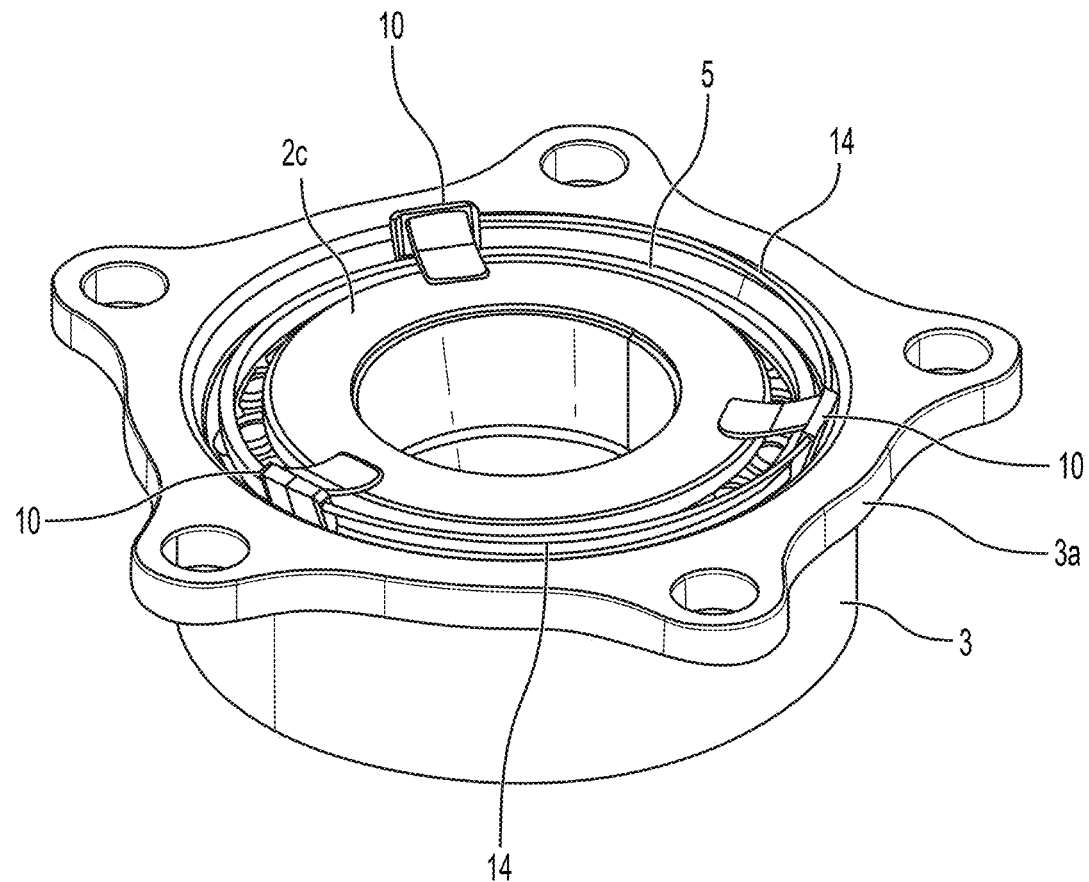
FIG. 8 illustrates the double-row tapered roller bearing to which the double-row tapered roller bearing assembling jig according to the first is attached.

First, a configuration of a double-row tapered roller bearing assembling jig 10 according to a first embodiment will be described with reference to FIGS. 1 to 8. FIG. 1 is a cross-sectional view that illustrates a configuration of a double-row tapered roller bearing 1. FIG. 2 is a cross-sectional view that illustrates a state (normal state) in which no gap is formed on a large end side of a tapered roller 4 (between a large end surface 4a of the tapered roller 4 and a large flange 2a of an inner ring 2). FIG. 3 is a cross-sectional view that illustrates a state in which a gap is formed on the large end side of the tapered roller 4 (between the large end surface 4a of the tapered roller 4 and the large flange 2a of the inner ring 2). FIG. 4 illustrates a configuration of the double-row tapered roller bearing assembling jig 10. FIG. 5 illustrates the inner ring 2, the tapered rollers 4, and cages 5 before the double-row tapered roller bearing assembling jig 10 is attached. FIG. 6 illustrates the inner ring 2, the tapered rollers 4, and the cages 5 to which the double-row tapered roller bearing assembling jig 10 is attached. FIG. 7 is an enlarged cross-sectional view that illustrates housing spaces 5a of the cage 5 with which claws 12 of the double-row tapered roller bearing assembling jig 10 are engaged. FIG. 8 illustrates the double-row tapered roller bearing 1 to which the double-row tapered roller bearing assembling jig 10 is attached.

Figure 14:
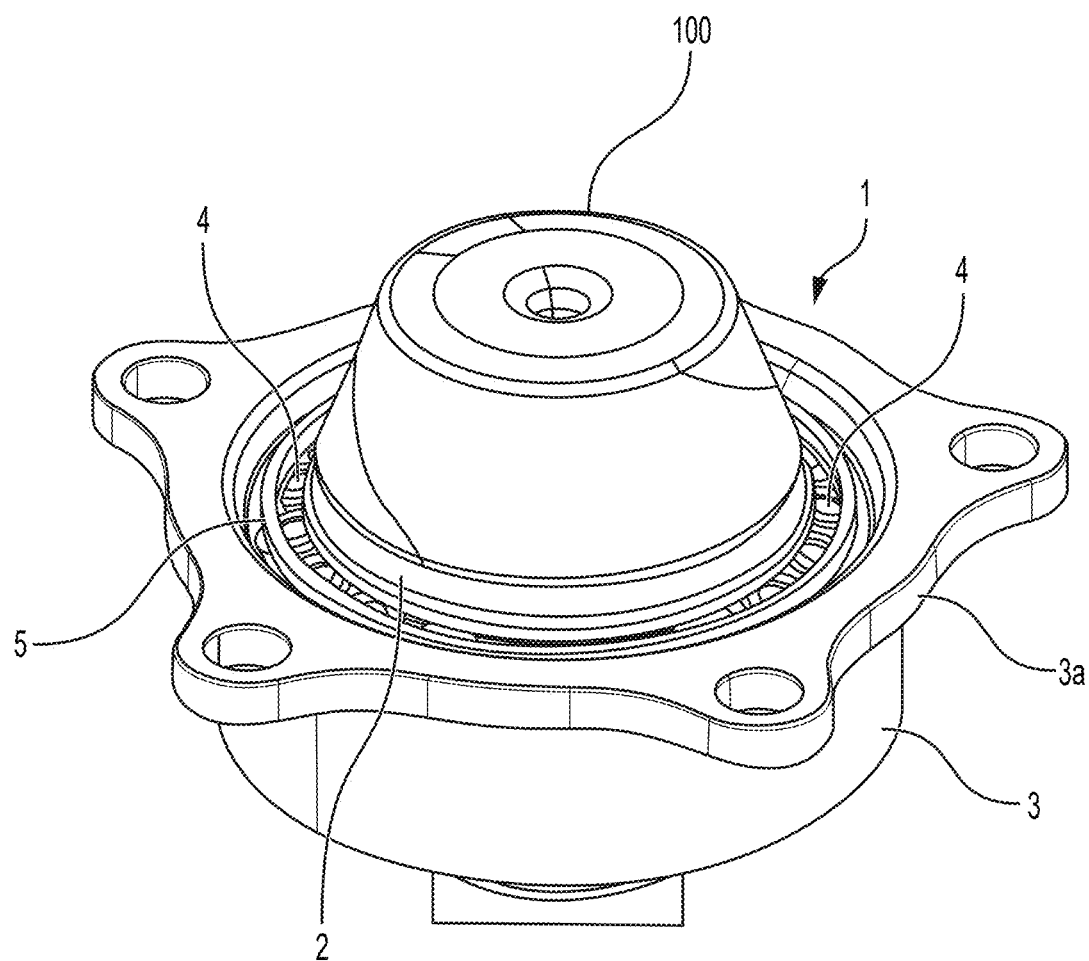
FIG. 14 describes the assembling method (fifth step) for the double-row tapered roller bearing that uses the double-row tapered roller bearing assembling jig according to the embodiment.

The double-row tapered roller bearing (double taper roller bearing) 1 can simultaneously support radial load and bidirectional axial load, and, for example, rotatably supports a rotating member 100 such as a drive pinion shaft or a hub (see FIG. 14).

The double-row tapered roller bearing 1 is constituted by a pair of tapered roller bearings disposed facing each other. Each of the tapered roller bearings includes the inner ring 2, an outer ring 3, a plurality of the tapered rollers 4 rotatably disposed between the inner ring 2 and the outer ring 3, and the cage 5 configured to hold the plurality of tapered rollers 4 at predetermined intervals along the circumferential direction. For example, the double-row tapered roller bearing 1 according to the present embodiment is an outward-facing double-row tapered roller bearing. The double-row tapered roller bearing 1 includes a pair of the inner rings 2, the single outer ring 3, a plurality of the tapered rollers 4 rotatably disposed between one of the inner rings 2 and the outer ring 3 and between the other of the inner rings 2 and the outer ring 3, and a pair of the cages 5 configured to hold the plurality of tapered rollers 4 at the predetermined intervals along the circumferential direction.

In more detail, the inner ring 2 has a conical raceway surface on a radially outer surface thereof. The large flange (flange) 2a protruding radially outward is formed on a large end side (large diameter side) of the raceway surface. In addition, the inner ring 2 has a small flange (flange) 2b on a small end side (small diameter side) in order to prevent or restrict the tapered roller 4 from falling through the small end side.

The outer ring 3 has a pair of conical raceway surfaces on a radially inner surface thereof, and the plurality of tapered rollers 4 held by the cages 5 roll on these raceway surfaces and the raceway surfaces of the inner rings 2.

The cage 5 includes a pair of annular portions (a large diameter-side annular portion and a small diameter-side annular portion) and columns coupling the annular portions (the large diameter-side annular portion and the small diameter-side annular portion) with each other. The tapered rollers 4 are rotatably housed in the housing spaces (pockets) 5a formed between the columns adjacent to each other along the circumferential direction.

In each of the tapered roller bearings, the tapered rollers 4 and the raceway surfaces of the inner and outer rings are in line contact with each other. The inner and outer ring raceway surfaces and the roller center of the tapered roller 4 are designed to coincide with each other at one point on the axial center of the tapered roller 4.

The double-row tapered roller bearing 1 is typically used with a preload applied between the inner and outer rings and the tapered rollers from the viewpoint of ensuring durability (long lifetime), reliability, and the like. For example, when the rotating member 100, such as a shaft, is assembled to the double-row tapered roller bearing 1, the rotating member 100, such as the shaft, is press-fitted into the double-row tapered roller bearing 1 (inner rings 2), expanding the diameter of the inner rings 2. As a result, the preload is applied.

However, at the time of assembly of the double-row tapered roller bearing 1, depending on working conditions or the like when the rotating member 100, such as the shaft, is press-fitted into the double-row tapered roller bearing 1, for example, the outer ring 3 or the tapered rollers 4 on the upper side in the vertical direction may fall due to its own weight. As a result, a gap may be formed on the large end side of the tapered roller 4 (between the large end surface 4a of the tapered roller 4 and the large flange 2a of the inner ring 2), as illustrated in FIG. 3. The gap may remain even after the press-fitting of the rotating member 100. When the double-row tapered roller bearing 1 is used in such a state, the preload may be reduced.

Here, the double-row tapered roller bearing assembling jig (hereinafter sometimes simply referred to as the "assembling jig") 10 has a function of preventing or restricting the reduction in preload (and consequently improving the durability and reliability of the double-row tapered roller bearing 1). This is made possible by preventing or restricting a gap from being formed on the large end side of the tapered roller 4 (between the large end surface 4a of the tapered roller 4 and the large flange 2a of the inner ring 2) at the time of assembly of the double-row tapered roller bearing 1, namely, when the rotating member 100 is press-fitted into the double-row tapered roller bearing 1.

Thus, when the double-row tapered roller bearing 1 is assembled to the rotating member (shaft) 100, the double-row tapered roller bearing assembling jig 10 brings and holds one of the cages 5 near to the large end side (large diameter side) of one of the inner rings 2. This eliminates or reduces the gap between the large end surface 4a of the tapered rollers 4 that constitute one of the tapered roller bearings (the tapered roller bearing on the upper side in the vertical direction), and the large flange 2a of the one of the inner rings 2 (prevents or restricts the tapered rollers 4 from falling due to its own weight or the like). Here, by bringing and holding the one of the cages 5 near to the large end side of the one of the inner rings 2, the plurality of tapered rollers 4 (18 tapered rollers 4, for example) can be collectively held.

In one example, the double-row tapered roller bearing assembling jig 10 mainly includes a main body 11, the claws 12, a plate spring 13, and a coupling member 14.

The main body 11 is formed in a substantially rectangular parallelepiped shape extending substantially parallel to the roller center (central axis) of the tapered roller 4, and is attachable to the outer circumferential surface of the annular portion of the one of the cages 5.

The claw 12 is formed at a lower end portion (one end portion) of the main body 11, and is formed engageably with (hookably onto) an edge on the large end side (the large diameter-side annular portion) of the housing space 5a, which houses the tapered roller 4, of the one of the cages 5.

The plate spring 13 protrudes from an upper end portion (the other end portion) of the main body 11, and has flexibility (spring properties). When the double-row tapered roller bearing assembling jig 10 is attached, the plate spring 13 warps in a bow shape and applies, to the one of the cages 5, an urging force in a direction toward the large end surface 2c of the inner ring 2, the urging force resulting from a tip end of the plate spring 13 coming into contact with a large end surface 2c of the one of the inner rings 2. Due to this urging force, the cage 5 is brought and held near to the large end side of the inner ring 2.

The double-row tapered roller bearing assembling jig 10 (the main body 11, the claws 12, and the plate spring 13) is formed of, for example, resin (engineering plastic).

The double-row tapered roller bearing assembling jigs 10 are used with three double-row tapered roller bearing assembling jigs 10 constituting a unit (set), for example. In other words, at the time of assembly, the cage 5 can be brought and held near to the large end side of the inner ring 2 at three positions.

Further, in order to improve workability at the time of assembly, the double-row tapered roller bearing assembling jig 10 includes the coupling member 14 that couples a plurality of the assembling jigs 10 (three assembling jigs 10 in the present embodiment) with each other in an arc shape.

The coupling member 14 is made of resin, rubber, or the like that have flexibility. The coupling member 14 is formed in the shape of a string that has a circular cross section, for example. The coupling member 14 is coupled to a side surface of the main body 11 of each of the assembling jigs 10, for example.

Next, an assembling method for a double-row tapered roller bearing that uses the double-row tapered roller bearing assembling jig 10 will be described.

When the rotating member (shaft) 100 is assembled to the double-row tapered roller bearing 1, first, at a first step, the double-row tapered roller bearing assembling jig 10 is attached to the one of the inner rings 2 (see FIGS. 6 and 8). As a result, the one of the cages 5 is brought and held near to the large end side of the one of the inner rings 2.

Subsequently, at a second step, the rotating member 100 is press-fitted into the double-row tapered roller bearing 1 to which the assembling jig 10 is attached. Thereafter, at a third step, the assembling jig 10 is removed from the double-row tapered roller bearing 1.

As described above in detail, according to the present embodiment, when the double-row tapered roller bearing 1 is assembled to the rotating member 100, the one of the cages 5 is brought and held near to the large end side of the one of the inner rings 2. This eliminates or reduces the gap between the large end surface 4a of the tapered rollers 4 that constitute the one of the tapered roller bearings (the tapered roller bearing on the upper side in the vertical direction), and the large flange 2a of the one of the inner rings 2. Thus, at the time of assembly of the double-row tapered roller bearing 1, namely, when the rotating member 100 is press-fitted into the double-row tapered roller bearing 1, the reduction in preload can be prevented or restricted (and consequently, the durability and reliability of the double-row tapered roller bearing 1 can be improved). This is made possible by preventing or restricting the gap from being formed on the large end side of the tapered roller 4 (between the large end surface 4a of the tapered roller 4 and the large flange 2a of the inner ring 2).

In particular, according to the present embodiment, the double-row tapered roller bearing assembling jig 10 includes the main body 11, the claws 12, and the plate spring 13. The main body 11 has the substantially rectangular parallelepiped shape extending substantially parallel to the central axis of the tapered roller 4, and is attachable to the outer circumferential surface of the annular portion of the one of the cages 5. The claws 12 is formed at the lower end portion of the main body 11 and is configured to engage with the edge on the large end side of the housing space 5a of the one of the cages 5. The plate spring 13 protrudes from the upper end portion of the main body and has flexibility. The plate spring 13 is configured, when the double-row tapered roller bearing assembling jig 10 is attached, to warp in the bow shape and apply, to the one of the cages 5, the urging force in the direction toward the large end surface 2c of the one of the inner rings 2, the urging force resulting from the tip end of the plate spring 13 coming into contact with the large end surface 2c of the one of the inner rings 2. Thus, when the double-row tapered roller bearing 1 is assembled to the rotating member 100, the one of the cages 5 can be brought and held near to the large end side of the one of the inner rings 2, with the gap between the large end surface 4a of the tapered roller 4 and the large flange 2a of the one of the inner rings 2 eliminated or reduced.

According to the present embodiment, since the coupling member 14 configured to couple the plurality of assembling jigs 10 (three assembling jigs 10, for example) with each other in the arc shape is provided, the workability at the time of assembly can be improved.

Further, according to the present embodiment, when the rotating member 100 is assembled to the double-row tapered roller bearing 1, first, the double-row tapered roller bearing assembling jig 10 is attached to the one of the cages 2, and the one of the cages 5 is brought and held near to the large end side of the one of the inner rings 2 (first step). Subsequently, the rotating member 100 is press-fitted into the double-row tapered roller bearing 1 to which the assembling jig 10 is attached (second step). Thereafter, the assembling jig 10 is removed (third step). Thus, at the time of assembly of the double-row tapered roller bearing 1, namely, when the rotating member 100 is press-fitted into the double-row tapered roller bearing 1, the reduction in preload can be prevented or restricted (and consequently, the durability and reliability of the double-row tapered roller bearing 1 can be improved). This is made possible by preventing or restricting the gap from being formed on the large end side of the tapered roller 4 (between the large end surface 4a of the tapered roller 4 and the large flange 2a of the inner ring 2).

Second Embodiment

In the first embodiment described above, when the double-row tapered roller bearing 1 is assembled to the rotating member 100, the one of the cages 5 is brought and held near to the large end side of the one of the inner rings 2, with the gap between the large end surface 4a of the tapered roller 4 and the large flange 2a of the one of the inner rings 2 eliminated or reduced. Alternatively, however, the large flange 2a of the one of the inner rings 2 may be brought and held near to the large end side of the tapered rollers 4.

Figure 9:
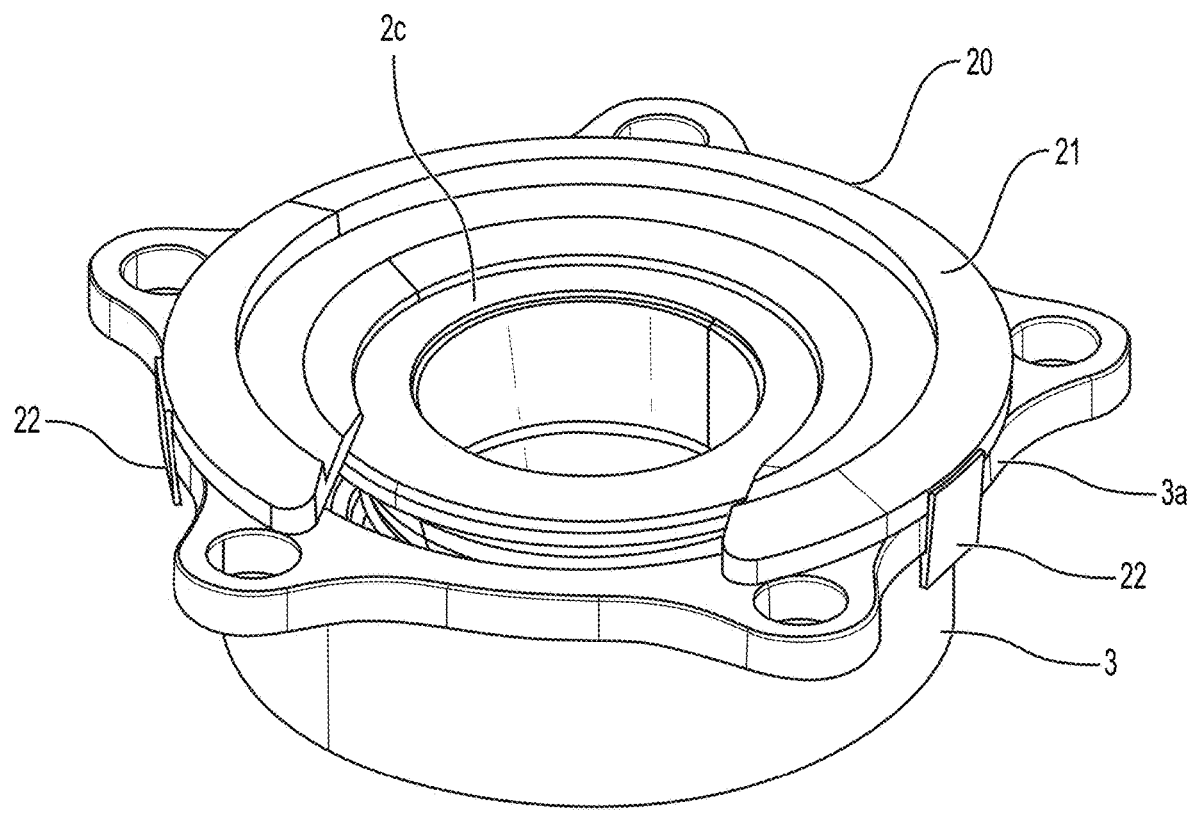
FIG. 9 is a perspective view that illustrates a configuration of a double-row tapered roller bearing assembling jig according to an embodiment.
Figure 10:
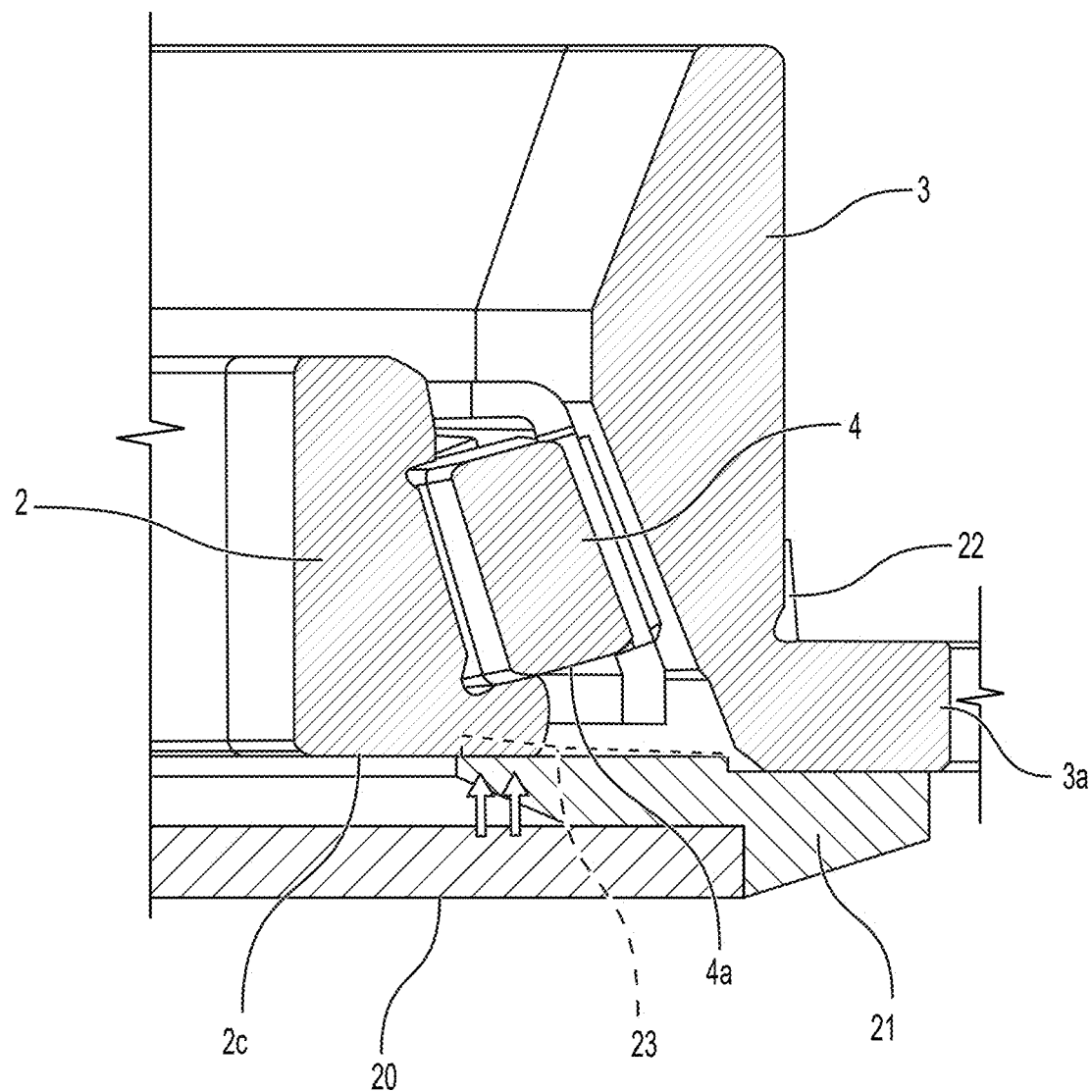
FIG. 10 is an enlarged cross-sectional view that illustrates main components of the double-row tapered roller bearing assembling jig according to the embodiment.

Next, a double-row tapered roller bearing assembling jig 20 according to a second embodiment will be described with reference to FIGS. 9 to 14. FIG. 9 is a perspective view that illustrates a configuration of the double-row tapered roller bearing assembling jig 20. FIG. 10 is an enlarged cross-sectional view that illustrates main components of the double-row tapered roller bearing assembling jig 20. FIGS. 11 to 14 describe an assembling method for a double-row tapered roller bearing that uses the double-row tapered roller bearing assembling jig 20 (second to fifth steps).

The present embodiment is different from the first embodiment described above in that the large flange 2a of the one of the inner rings 2 is brought and held near to the large end side of the tapered rollers 4, instead of the one of the cages 5 being brought and held near to the large end side of the one of the inner rings 2.

In one example, the double-row tapered roller bearing assembling jig 20 is made of, for example, resin (engineering plastic), and mainly includes a main body 21, claws 22, and a protrusion 23.

The main body 21 is formed in an arc shape and is attachable to the large end surface 2c of the one of the inner rings 2 and an end surface of the outer ring 3. The main body 21 has a notch that allows the assembling jig 20 to be removed by being slid in a lateral direction after the assembly of the rotating member 100.

The claw 22 is provided at a side surface of the main body 21, and is formed engageably with a flange 3a of the outer ring 3. The assembling jig 20 is attached to the double-row tapered roller bearing 1 by the claws 22 being hooked onto the flange 3a of the outer ring 3.

The protrusion 23 protrudes from the inner surface of the main body 21, the inner surface facing the large end surface 2c of the inner ring 2. When the assembling jig 20 is attached, the protrusion 23 applies a pressing force to the large end surface 2c of the inner ring 2. This eliminates or reduces the gap between the large end surface 4a of the tapered roller 4 and the large flange 2a of the one of the inner rings 2 (pushes up the inner ring 2). Note that since the other configurations of the second embodiment are the same as or similar to those of the first embodiment described above, detailed description thereof is omitted here.

Next, the assembling method for the double-row tapered roller bearing that uses the double-row tapered roller bearing assembling jig 20 will be described with reference to FIGS. 11 to 14.

When the rotating member 100 is assembled to the double-row tapered roller bearing 1, first, at a first step, one of the inner rings 2 (upper inner ring) is assembled to the outer ring 3 in an upside down state.

Figure 11:
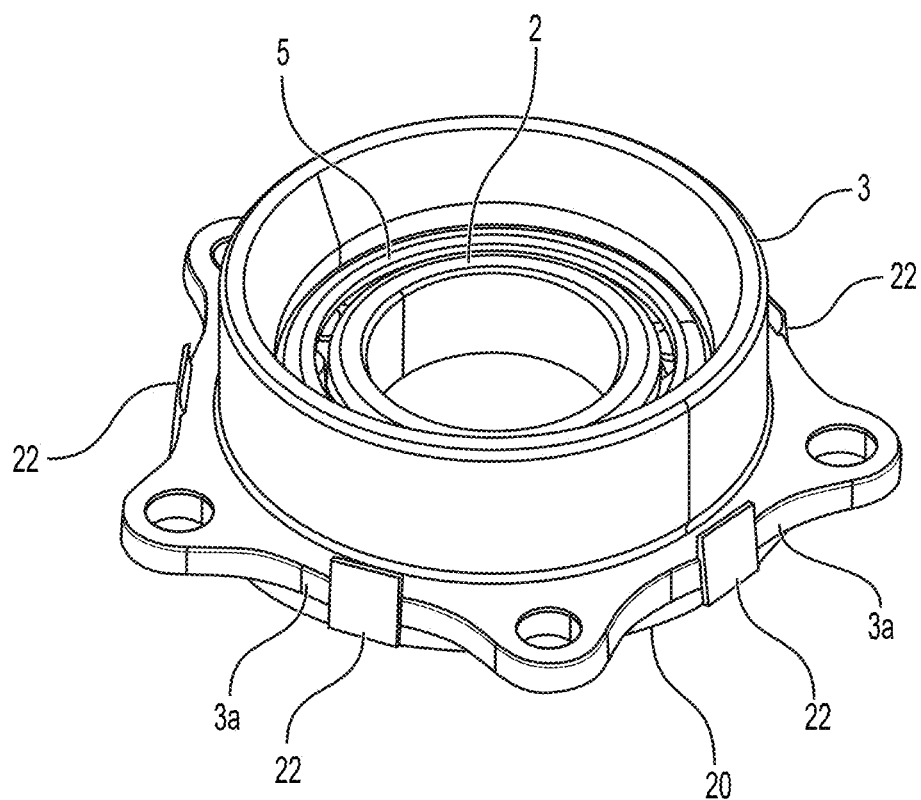
FIG. 11 describes an assembling method (second step) for a double-row tapered roller bearing that uses the double-row tapered roller bearing assembling jig according to the embodiment.

Subsequently, at a second step, in the upside down state, the double-row tapered roller bearing assembling jig 20 is attached to a lower portion of the one of the inner rings 2 (upper inner ring) (see FIG. 11). As a result, the inner ring 2 is pushed up, eliminating or reducing the gap between the large end surface 4a of the tapered roller 4 and the large flange 2a of the one of the inner rings 2. In other words, the large flange 2a of the one of the inner rings 2 is brought and held near to the large end surface 4a of the tapered roller 4.

Figure 12:
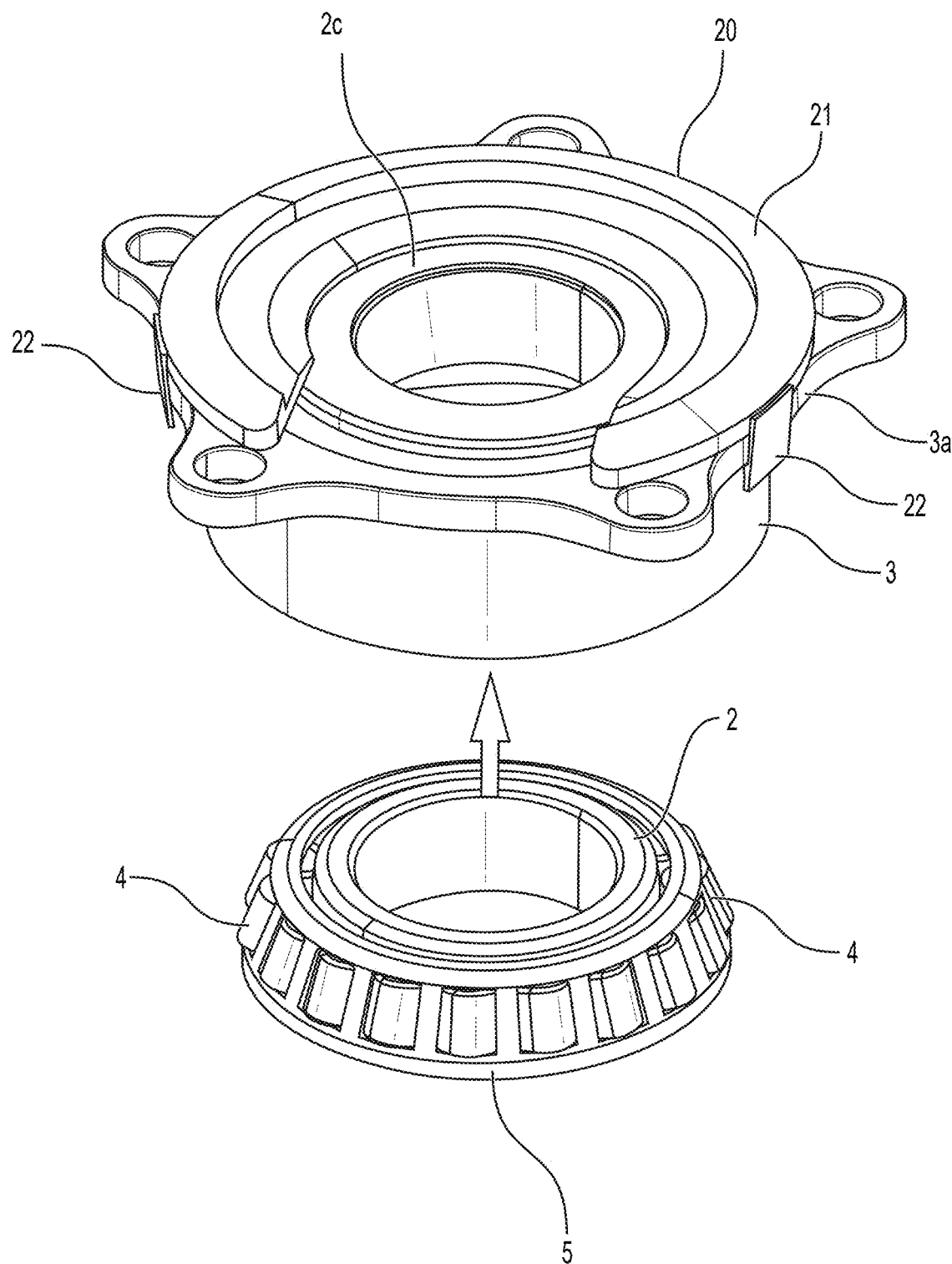
FIG. 12 describes the assembling method (third step) for the double-row tapered roller bearing that uses the double-row tapered roller bearing assembling jig according to the embodiment.

Subsequently, at a third step, the upside down state is returned to a right side up state, and the other of the inner rings 2 (lower inner ring) is assembled (see FIG. 12).

Figure 13:
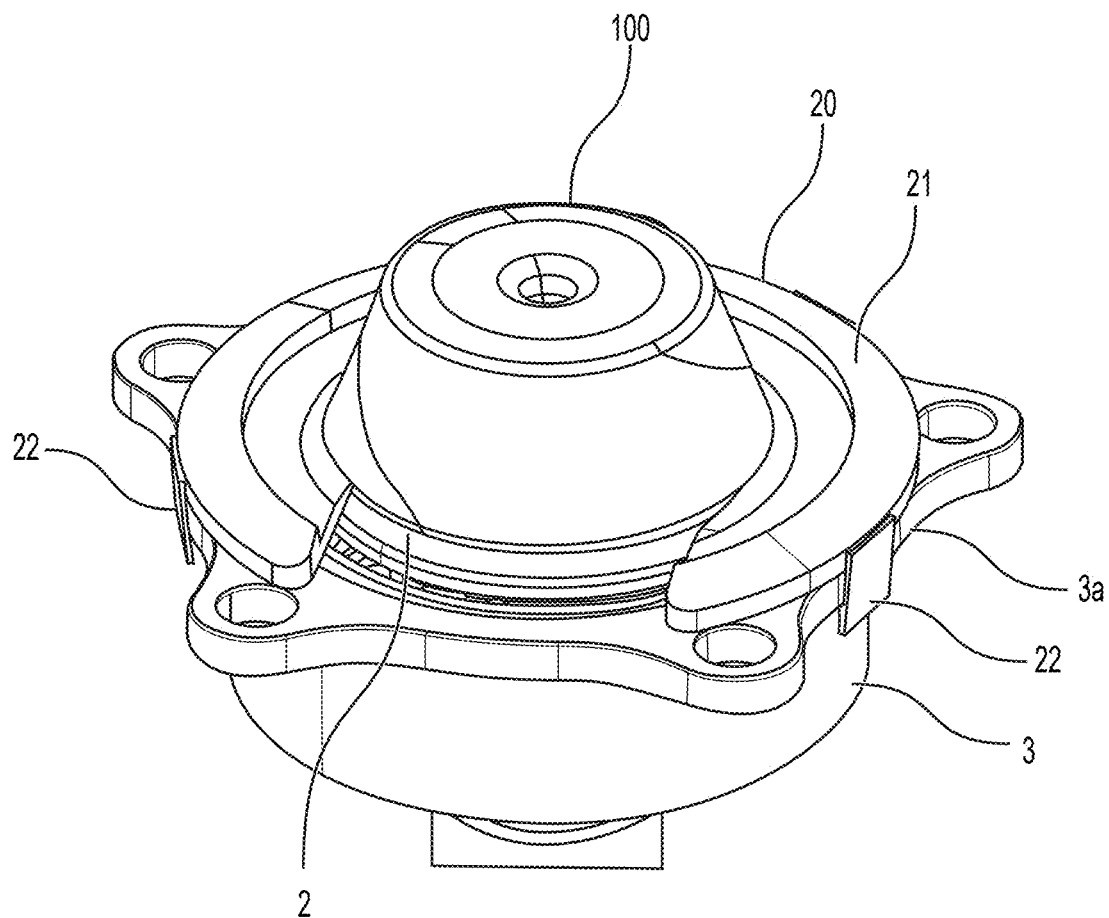
FIG. 13 describes the assembling method (fourth step) for the double-row tapered roller bearing that uses the double-row tapered roller bearing assembling jig according to the embodiment.

Thereafter, at a fourth step, in the right side up state, the rotating member (shaft) 100 is press-fitted into the double-row tapered roller bearing 1 to which the assembling jig 20 is attached (see FIG. 13).

Then, at a fifth step, the assembling jig 20 is removed from the double-row tapered roller bearing 1 (see FIG. 14).

According to the present embodiment, the double-row tapered roller bearing assembling jig 20 includes the main body 21, the claws 22, and the protrusion 23. The main body 21 is formed in the arc shape and is attachable to the large end surface 2c of the inner ring 2 and the end surface of the outer ring 3. The claws 22 is provided at the side surface of the main body 21 and is configured to engage with the flange 3a of the outer ring 3. The protrusion 23 is provided at the inner surface of the main body 21, the inner surface facing the large end surface 2c of the inner ring 2. The protrusion 23 is configured to apply, when the double-row tapered roller bearing assembling jig 20 is attached, the pressing force to the large end surface 2c of the inner ring 2 to eliminate or reduce the gap between the large end surface 4a of the tapered roller 4 and the large flange 2a of the one of the inner rings 2. Thus, when the double-row tapered roller bearing 1 is assembled to the rotating member 100, the large flange 2a of the one of the inner rings 2 can be brought and held near to the large end side of the tapered rollers 4. This eliminates or reduces the gap between the large end surface 4a of the tapered roller 4 and the large flange 2a of the one of the inner rings 2.

Further, according to the present embodiment, when the rotating member 100 is assembled to the double-row tapered roller bearing 1, the one of the inner rings 2 (upper inner ring) is assembled to the outer ring 3 in the upside down state (first step). Then, the double-row tapered roller bearing assembling jig 20 is attached to the one of the inner rings 2 (upper inner ring) in the upside down state (second step). Subsequently, the upside down state is returned to a right side up state, and the other of the inner rings 2 (lower inner ring) is assembled (third step). Then, in the right side up state, the rotating member 100 is press-fitted into the double-row tapered roller bearing 1 to which the assembling jig 20 is attached (fourth step). Thereafter, the assembling jig 20 is removed (fifth step). Thus, at the time of assembly of the double-row tapered roller bearing 1, namely, when the rotating member 100 is press-fitted into the double-row tapered roller bearing 1, the reduction in preload can be prevented or restricted (and consequently, the durability and reliability of the double-row tapered roller bearing 1 can be improved). This is made possible by preventing or restricting the gap from being formed on the large end side of the tapered roller 4 (between the large end surface 4a of the tapered roller 4 and the large flange 2a of the inner ring 2).

Although embodiments of the disclosure have been described above, the disclosure is not limited to the embodiments described above, and various modifications are possible. For example, in the embodiments described above, the outward-facing double-row tapered roller bearing 1 (that uses a double-row outer ring) has been described as an example. However, the disclosure can also be applied to an inward-facing double-row tapered roller bearing (that uses a double-row inner ring) or a combination tapered roller bearing.

Further, the number, shape, material, size, and the like of the double-row tapered roller bearing assembling jig 10, 20 are not limited to those described in the embodiments above, and can be changed as desired in accordance with a double-row tapered roller bearing to which the double-row tapered roller bearing assembling jig 10, 20 is applied, requirements, and the like.

The invention claimed is:

1. A double-row tapered roller bearing assembling jig to be used when assembling, to a rotating member, a double-row tapered roller bearing including a pair of tapered roller bearings disposed facing each other, each of the pair of tapered roller bearings comprising an inner ring, an outer ring, a plurality of tapered rollers rollably disposed between the inner ring and the outer ring, and a cage that holds the plurality of tapered rollers, the cage constituting cages of the pair of tapered roller bearings, wherein the double-row tapered roller bearing assembling jig comprises:
at least one main body;
an engagement claw or claws extending from the at least one main body; and
at least one plate spring also extending from the at least one main body, and
wherein the double-row tapered roller bearing assembling jig is configured such that, when the double-row tapered roller bearing is assembled to the rotating member, the at least one main body, engagement claw or claws, and the at least one plate spring of the double-row tapered roller bearing assembling jig each contact the double-row tapered roller bearing so as to bring and hold one of the cages adjacent to a large end side of one of the inner rings or so as to bring and hold a large flange of the one of the inner rings adjacent to a large end side of the tapered rollers, with gap formation between a large end surface of the tapered rollers that constitute one of the tapered roller bearings and the large flange of the one of the inner rings, which might otherwise be introduced when the double-row tapered roller bearing is assembled to the rotating member, being eliminated or reduced.

2. The double-row tapered roller bearing assembling jig according to claim 1,
wherein the at least one main body includes a plurality of main bodies each with an associated claw or claws and each with the at least one plate spring; and
a coupling member configured to couple the plurality of main bodies with each other in an arc shape.

3. The double-row tapered roller bearing assembling jig according to claim 2, wherein the coupling member comprises coupling member segments that respectively extend between adjacent pairs of the main bodies such that the main bodies are circumferentially spaced apart.

4. The double-row tapered roller bearing assembling jig according to claim 3, wherein the coupling member is formed of resin or rubber so as to be flexible.

5. The double-row tapered roller bearing assembling jig according to claim 1, wherein the at least one main body has at least two claws circumferentially spaced apart.

6. The double-row tapered roller bearing assembling jig according to claim 1, wherein the at least one main body, the engagement claw or claws and the at least one plate spring are formed of resin.

7. The double-row tapered roller bearing assembling jig according to claim 1, wherein the at least one plate spring protrudes away from a first end of the at least one main body.

8. The double-row tapered roller bearing assembling jig according to claim 7, wherein the engagement claw or claws protrudes away from a second, opposite end of the at least one main body in a common direction of extension as that of the plate spring.

9. The double-row tapered roller bearing assembling jig according to claim 8, wherein the plate spring extends farther away from the main body in the common direction of extension from the first end of the at least one main body than the engagement claw or claws at the second, opposite end of said at least one main body.

10. The double-row tapered roller bearing assembling jig according to claim 1, wherein there are a plurality of claws extending from a first end of the at least one main body and the at least one plate spring extends from a second, opposite end of the at least one main body.

11. The double-row tapered roller bearing assembling jig according to claim 10, wherein the claws, the at least one main body, and the at least one plate spring are formed as a single unit of plastic.

12. The double-row tapered roller bearing assembling jig according to claim 1,
wherein the at least one main body comprises a substantially rectangular parallelepiped shaped main body extending substantially parallel to a central axis of the tapered roller, the substantially rectangular parallelepiped shaped main body being attachable to an outer circumferential surface of an annular portion of the one of the cages;
the engagement claw or claws extending from the substantially rectangular parallelepiped shaped main body is formed at a first end portion of the substantially rectangular parallelepiped shaped main body and is configured to engage with an edge on a large end side of a housing space that houses the tapered roller, of the one of the cages; and the at least one plate spring of the substantially rectangular parallelepiped shaped main body (i) protrudes from a second end portion of the substantially rectangular parallelepiped shaped main body which is opposite to the first end portion and (ii) has flexibility, the plate spring being configured to apply, to the one of the cages, an urging force in a direction toward the large end surface of the one of the inner rings, when the double-row tapered roller bearing is attached, the urging force resulting from a tip end of the plate spring coming into contact with the large end surface of the one of the inner rings.

13. An assembling method for a double-row tapered roller bearing, the assembling method comprising:

a first step of attaching a double-row tapered roller bearing assembling jig according to claim 12 to the one of the inner rings;

a second step of press-fitting a rotating member into the double-row tapered roller bearing to which the double-row tapered roller bearing assembling jig is attached; and a third step of removing the double-row tapered roller bearing assembling jig.

14. A double-row tapered roller bearing assembling jig to be used when assembling, to a rotating member, a double-row tapered roller bearing including a pair of tapered roller bearings disposed facing each other, each of the pair of tapered roller bearings comprising an inner ring, an outer ring, a plurality of tapered rollers rollably disposed between the inner ring and the outer ring, and a cage that holds the plurality of tapered rollers, the cage constituting cages of the pair of tapered roller bearings, wherein the double-row tapered roller bearing assembling jig comprises:

at least one main body;

an engagement claw or claws extending from the at least one main body; and at least one protrusion also extending from the at least one main body, and wherein the double-row tapered roller bearing assembling jig is configured such that, when the double-row tapered roller bearing is assembled to the rotating member, the at least one main body, engagement claw or claws, and the at least one protrusion of the double-row tapered roller bearing assembling jig each contact the double-row tapered roller bearing so as to bring and hold one of the cages adjacent to a large end side of one of the inner rings or so as to bring and hold a large flange of the one of the inner rings adjacent to a large end side of the tapered rollers, with gap formation between a large end surface of the tapered rollers that constitute one of the tapered roller bearings and the large flange of the one of the inner rings, which might otherwise be introduced when the double-row tapered roller bearing is assembled to the rotating member, being eliminated or reduced.

15. The double-row tapered roller bearing assembling jig according to claim 14, wherein the at least one main body includes an arc shaped main body that is attachable to a large end surface of the one of the inner rings and an end surface of the outer ring;

said engagement claw or claws being provided at a side surface of the arc shaped main body and configured to engage with a flange of the outer ring; and the at least one protrusion protrudes from an inner surface of the main body, the inner surface facing the large end surface of the one of the inner rings, the at least one protrusion being configured to apply, when the double-row tapered roller bearing assembling jig is attached, a pressing force to the large end surface of the inner ring to eliminate or reduce gap formation between the large end surface of the tapered roller and the large flange of the one of the inner rings.

16. The double-row tapered roller bearing assembling jig according to claim 14, wherein the double-row tapered roller bearing assembling jig has a single main body with multiple circumferentially spaced claws extending off the single main body and the at least one protrusion also extends off the single main body.

17. The double-row tapered roller bearing assembling jig according to claim 16, wherein there are at least three spaced claws supported by the single main body.

18. An assembling method for a double-row tapered roller bearing, the assembling method comprising:

a first step of assembling one of the inner rings to an outer ring such that said one of the inner rings is in a first orientation state;

a second step of attaching, while said one of the inner rings is still in the first orientation state, a double-row tapered roller bearing assembling jig according to claim 4 to a large end surface of the one of the inner rings and an adjacent end surface of the outer ring, and wherein, when said one of the inner rings is in the first orientation, the double-row tapered roller bearing assembling jig is positioned below, in a direction of gravity, the end surface of said one of the inner rings and below, in the direction of gravity, the adjacent end surface of the outer ring;

a third step of flipping the attached double-row tapered roller bearing assembling jig and said one of the inner rings such that said one of the inner rings shifts from the first orientation state to a second orientation state in which said double-row tapered roller bearing assembling jig is positioned above, in the direction of gravity, said one of the inner rings and assembling another of the inner rings;

a fourth step of press-fitting, while said one of the inner rings is in the second orientation state, a rotating member into the double-row tapered roller bearing to which the double-row tapered roller bearing assembling jig is attached; and a fifth step of removing the double-row tapered roller bearing assembling jig.

\* \* \* \* \*